INVENTOR.
EUGENE C. KARNES
BY C. G. Stratton
ATTORNEY 2,796,663
TUBE CUTTER

Eugene C. Karnes, Northridge, Calif.

Application June 6, 1956, Serial No. 589,709

2 Claims. (Cl. 30—102)

This invention relates to a tube cutter and particularly to a cutter adapted to be used in confined places, as for cutting the end of an automobile exhaust pipe.

An object of the present invention is to provide a novel and compactly designed cutter that is especially adapted for encircling cutting movement of a tube in confined places.

Another object of the invention is to provide a tube cutter that is adjustable to cut tubes varying in diametral size and in confined quarters.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Figure 1:
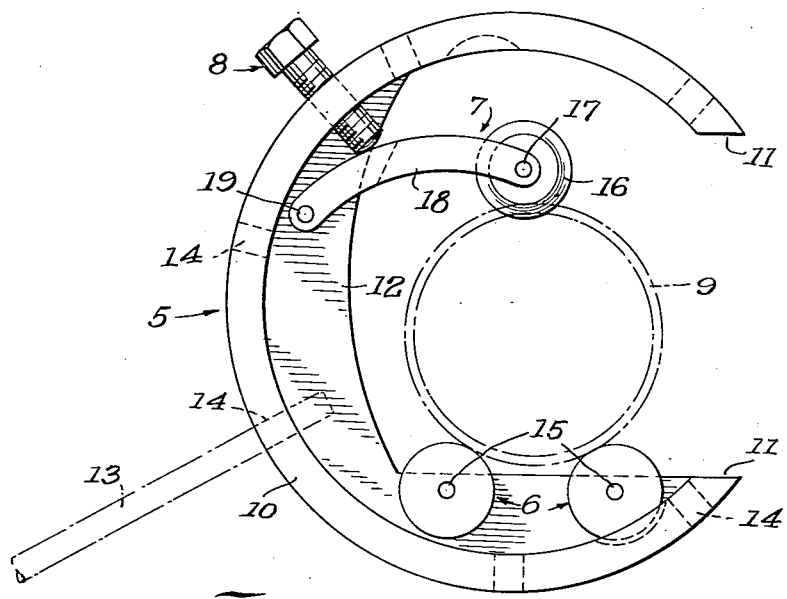
Fig. 1 is a side elevational view of a tube cutter according to the present invention.
Figure 2:
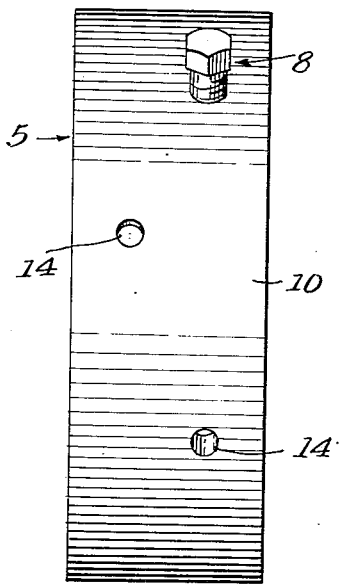
Fig. 2 is an elevational view as taken from the left side of Fig. 1.
Figure 3:
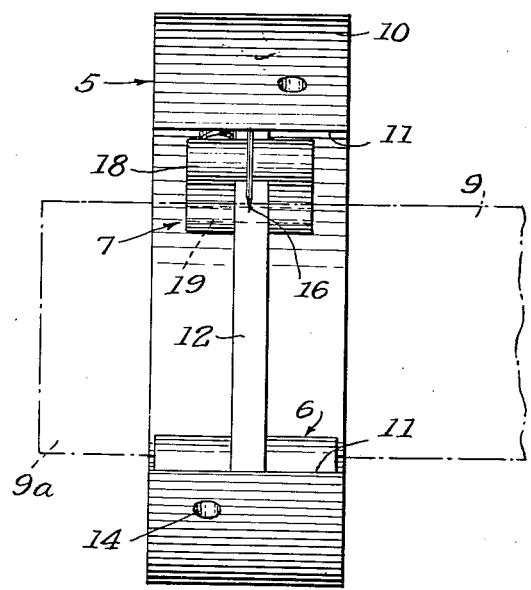
Fig. 3 is a similar view as taken from the right side of Fig. 1.

The cutter that is illustrated comprises, generally, a frame 5, tube-engaging rollers 6 mounted within said frame, a cutter means 7 mounted in said frame in opposed relation to the rollers 6, and means 8 to adjust the cutter means 7 according to the diametral size of a tube 9 to be cut.

The frame 5 is preferably C-shaped, being formed to have a frame wall 10 of preferably arcuate form, the ends 11 of said wall being so spaced as to define a gap for admitting a tube 9 laterally into the hollow of said wall 10. Said gap is preferably of such size as to admit a tube having a diameter approaching three-quarters the internal diameter of the frame wall 10. Thus, the outer diametral size of the frame may be kept to a relatively small size of about one-half larger than said gap, and the size of tube 9 adapted to be accommodated in said frame.

Since it is desired to keep the outer size of the frame 5 as small as is practicable for the purpose, the thickness of the arcuate wall 10 may be kept small. Any spring resulting from such small thickness of the frame wall may be obviated by providing an inner fin or web 12 to reinforce wall 10 and yet leaving the inner wall of the frame free to receive tubes to be cut. While said web 12 is shown as centrally disposed between the sides of the frame, the same may be placed at one side or two such webs may be provided, as desired.

The present cutter is operated by a rotational movement around the tube being cut. In order to effect such movement with suitable power to cut through a tube, any suitable elongated member 13 may be connected to the frame 5 and extend radially therefrom to constitute an operating handle. Screwdrivers, wrench handles, etc. are examples of the member 13 that may be used. Separable connection of such member may be effected by insertion into one of the holes 14 formed in frame wall 10. Fig. 1 shows such a connection and the same illustrates that any of the several holes 14 may be used, depending on accessibility in confined places. The frame may be oscillated by means of its handle or progressively advanced in a circular path by moving the handle member 13 from hole to hole, as required by the limitations of space.

The rollers 6 are shown as carried on axles 15 by web 12, the same being located inward of and adjacent one end of the frame wall 10. Said axles extend in a direction transverse to the diametral extent of the frame and, therefore, are parallel to the axis of the frame. As shown, said rollers are arranged in pairs on opposite sides of web 12 but may be designed, according to the disposition of said web or webs, to have substantial tube-engaging extent.

The cutter means 7 comprises a freely rotational cutter wheel or disc 16, the same being carried on an axle 17 at the free end of a pivotally-adjustable arm or lever 18. The latter is carried by web 12 as on a pivot 19 and is movable on said pivot in a direction toward and from the rollers 6. It will be noted that cutter wheel 16 is inward of and adjacent the wall end 11 that is opposite to the end adjacent to said rollers 6. Hence, a relatively large tube 9 may be accommodated between said wheels 6 and cutter disc 16, substantially in the manner shown.

The adjusting means 8 is shown as a cap screw carried by the frame wall 10 to one side of web 12 and directed to impinge on arm 18 between its pivot 19 and the cutter disc 16.

In practice, the cutter means 7 may be retracted to allow the device to be placed over a tube 9 to be cut. After engagement of the tube by rollers 6 is effected, the adjusting means 8 may be taken up to press the cutter disc 6 against the tube 9. Now, the device may be rotated, as above described, by a member 13 until said disc has scribed a line in said tube. The depth of the line is then increased by a further adjustment of the means 8 to advance the position of the disc 16, and again rotating the device. The above is repeated until the tube 9 is completely cut through to sever the end 9a thereof from the main portion of the tube 9.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. A tube cutter comprising a frame provided with an arcuate wall and a reinforcing web interiorly of the wall, tube-supporting rollers carried by the web adjacent one end of the open side of the arcuate wall, a pivotally-mounted cutter disc carried by the web adjacent the other end of the open side of the arcuate wall, said wall being provided with a set of holes for selective engagement by an elongated member that constitutes a handle for rotating the frame around a tube disposed between said rollers and cutter disc, and means to adjust said disc in a direction toward the rollers.

2. A tube cutter according to claim 1 in which the disc is carried by an arm and said arm is pivotally mounted on said web, the adjusting means engaging the arm between its pivot and the cutter disc thereon.

References Cited in the file of this patent

UNITED STATES PATENTS

| | | |
|---|---|---|
| 234,689 | Saunders | Nov. 23, 1880 |
| 2,718,058 | Arnold | Sept. 20, 1953 |